Dec. 15, 1959   L. HALLAS   2,917,680
ARRANGEMENTS FOR ACTUATING ELECTRIC RELAYS IN SEQUENCE
Filed March 23, 1954   5 Sheets-Sheet 1
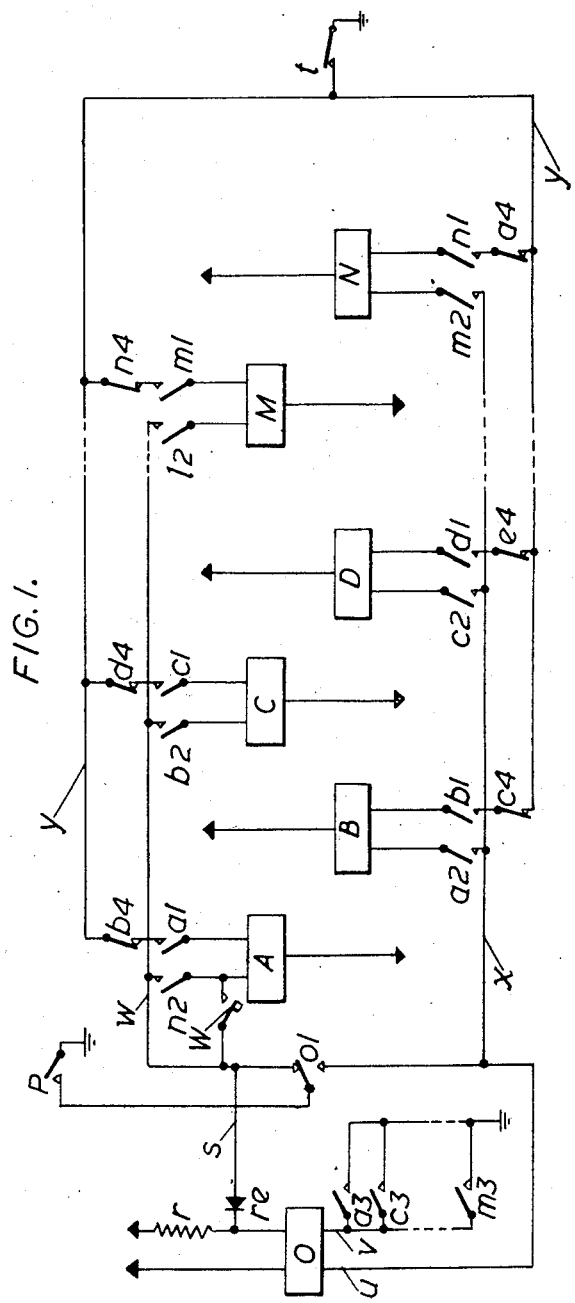
Inventor
Lister Hallas
By
Watt, Mackey & Burden
Attorney Dec. 15, 1959 L. HALLAS 2,917,680
ARRANGEMENTS FOR ACTUATING ELECTRIC RELAYS IN SEQUENCE
Filed March 23, 1954 5 Sheets-Sheet 2
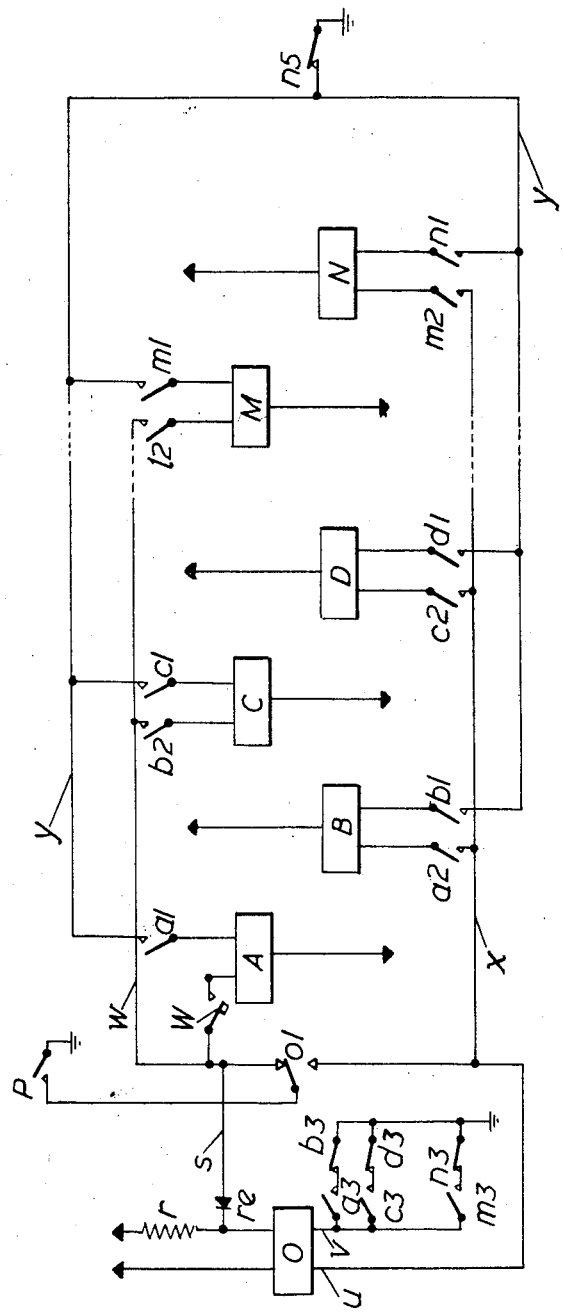
FIG. IA.
Inventor
Lister Hallas
By
Nebt Mackey + Burden
Attorney

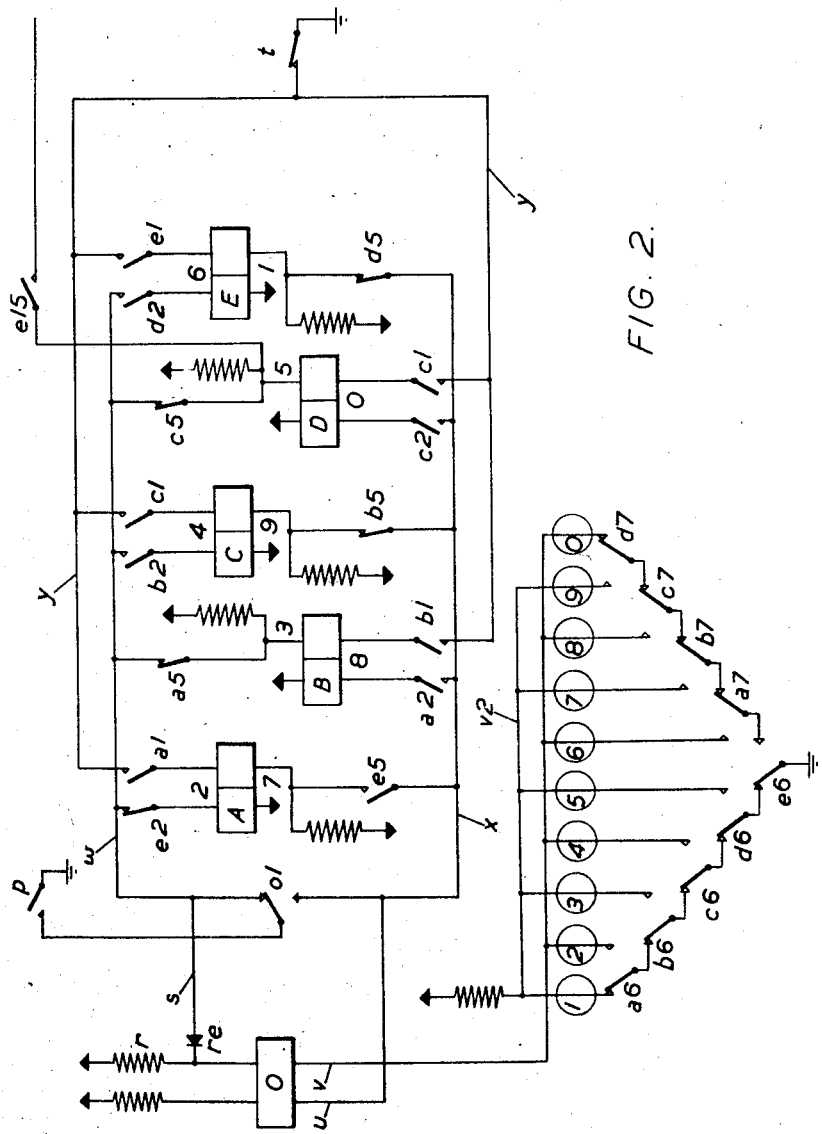

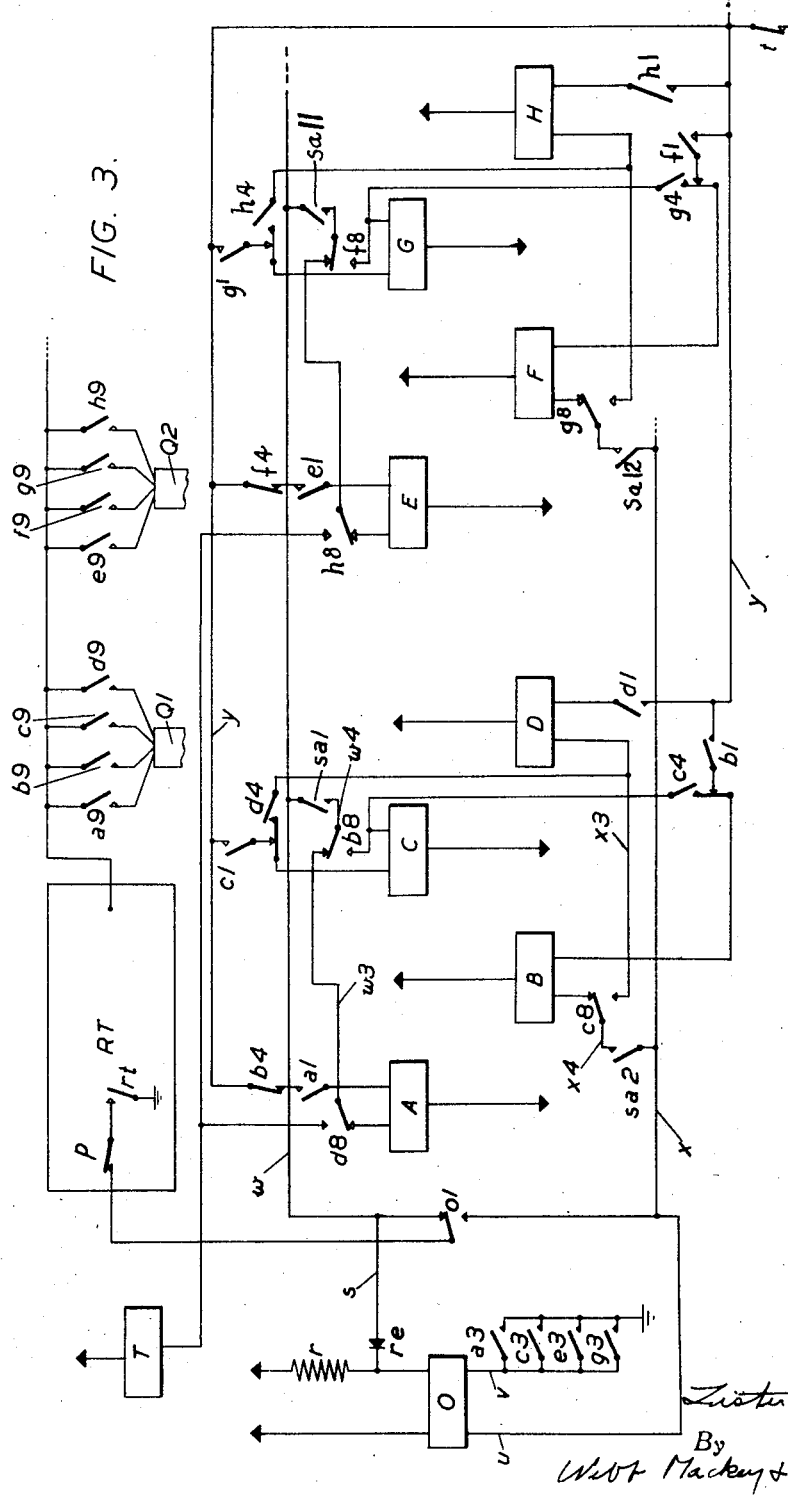

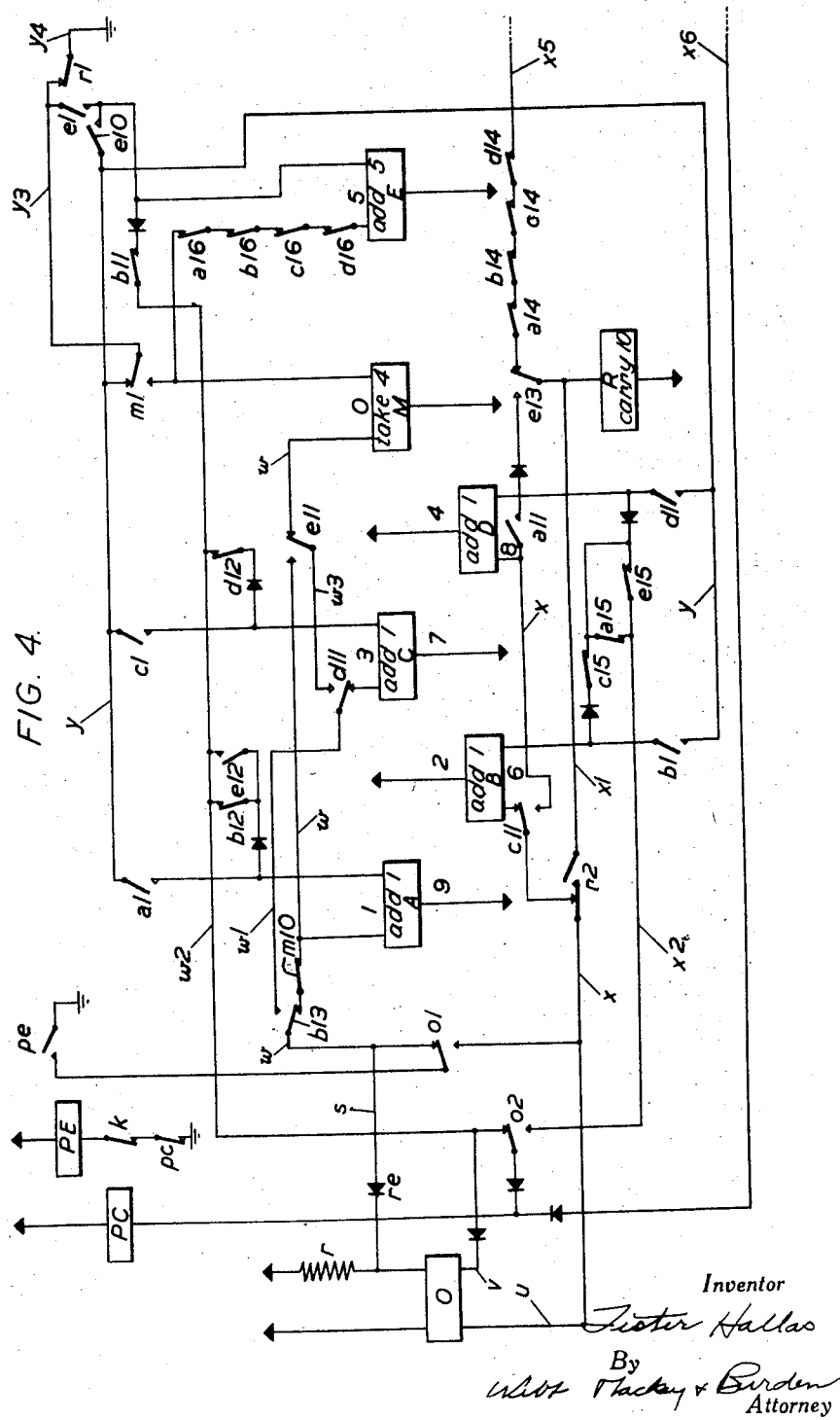

United States Patent Office 2,917,680
Patented Dec. 15, 1959

2,917,680
ARRANGEMENTS FOR ACTUATING ELECTRIC RELAYS IN SEQUENCE

Lister Hallas, Romford, England, assignor to Southern United Telephone Cables Limited, Dagenham Dock, Essex, England, a British company Application March 23, 1954, Serial No. 418,145

Claims priority, application Great Britain April 13, 1953

4 Claims. (Cl. 317—140)

This invention relates to an arrangement for the actuation of a set of electric relays in sequence. The operation of each relay is brought about by the occurrence of a simple signal in a control circuit, this signal being repeated in order to produce the operation of the required number of relays. The order of sequence of operation of the relays is determined by the form of the circuit and the devices therein. The applications of the invention are numerous. The following are some examples.

This arrangement may be used for the purpose of counting, a number being recorded by the operation of a relay, for each actuation of a control signal. It may also be used for the adjustment of the value of some electric quantity, for instance by adding resistance or capacitance, in a circuit, as in the automatic adjustment of a bridge to balance. The repetition of the control signal in this case continues until stopped by a device dependent upon the attainment of balance in the bridge circuit. In another example the arrangement may be used for connecting a set of circuit elements to a test circuit wherein each is subjected to appropriate test conditions and after testing is taken out of the circuit and replaced by another element.

The control signal, which is a pulse of current, will be regarded for the purpose of the following description as due to the making and breaking of a circuit. The making of the circuit corresponds to the start of the current pulse and the breaking of its circuit to its end. It will, however, be understood that other means of getting appropriate current flow can be used.

In the arrangement in accordance with the invention each signal causes one of a set of relays (referred to for distinction as sequence relays) to operate at the making of the control circuit. These relays are arranged in two sets which for convenience may be referred to as the odd and even relays, since in operation in sequence an odd relay alternates with an even relay. Each set has an operating line (the relay line) and the transfer of the control signal between these two lines is made by a change-over relay. These lines will be called "the odd line" and "the even line" hereinafter. The changeover takes place at the break of the control circuit and for it the change-over relay is alternately operated and released by the break.

It will be seen that with this arrangement certainty of operation in dependence on the control signals is attained since each one of the sequence relays after the first can only be operated when the change-over has taken place and, while this change-over occurs at the break of the control circuit, the actuation of the sequence relay cannot take place until the following make of that circuit. Each sequence relay may prepare the exciting circuit for the next relay in sequence but the circuit of this next relay cannot be made alive until the change-over has occurred and the next signal has arrived. Thus, a given step in the operations to which the sequence relays are applied can only be performed after the completion of the preceding step.

It is preferred to use as the change-over relay a high speed electro-magnetic relay. It is required to cause this change-over relay to be alternately operated and released by the breaking of the control signal circuit. This can be done by providing the change-over relay with two separate windings and providing two separate operating circuits therefor. One of these circuits is arranged to be closed by each odd sequence relay but while so closed is kept out of action by its change-over relay winding being shunted by a low resistance path until the break of the control signal breaks this shunt. The other of the operating circuits of the change-over relay is arranged to be closed by the even line and the control signal and therefore is kept in action until the control signal breaks that circuit. Hence at the odd breaks of circuit by the control signal the holding out of action of the change-over relay is released and that relay switches over to the even line and at the even breaks of the control signal the holding in of the change-over relay is released so that it changes back to the odd line.

The invention will be further described by the aid of the accompanying drawings which show four diagrams of circuits in which the invention is embodied.

Figure 1 is a general diagram illustrating the method of operation of the relays without application of these relays to any specified purpose.

Figure 1A is a modification of the arrangement shown in Figure 1.

Figure 2 shows the application of the invention to a counting device.

Figure 3 shows the application of the invention to the connection of a number of wires of an electric communication cable in sequence to a testing device, and Figure 4 illustrates the use of the invention for the purpose of adding impedance in steps to a circuit, for instance for the purpose of balancing a bridge.

In these diagrams the termination of a line at a solid triangle indicates the connection there to a source of current; the large letters, where applied within a rectangle, indicate the coil of the relay represented by the rectangle; the corresponding small letters followed by numerals indicate contacts actuated by those relays. The contacts are shown in the positions which they occupy when the relay coils are not carrying current.

In Figure 1 the control signal is produced by the making and breaking of the contacts $p$. The changeover relay is indicated by the two-winding relay O which actuates the change-over switch $o1$. The figure is concerned with a group of fourteen relays, A, B . . . M, N, of which only A, B, C, D, M and N are shown. The relays A, C . . . M are the odd relays and are arranged to be connected with the odd line $w$. The relays B, D . . . N are the even relays and are arranged to be connected to the even line $x$. It will be seen that the change-over switch $o1$ puts these lines $w$ and $x$ alternately into connection with the incoming signal line from the control signal switch $p$. The line $y$ is the holding line for all the relays A . . . N.

The control signal switch $p$ is assumed to be opened and closed at regular intervals so as to give a continuous sequence of controlling pulses of current. To start the relay group in operation a push button switch W is closed by hand. The switch W must be of a kind which makes contact only for a very brief time, about equal to that required for the excitation of a relay and the closing of its contacts, and this timing must be inherent in the form of the switch and not controllable by the manner of its manipulation. Then, when the switch $p$ is closed, while switch W is also closed, the relay A is excited and closes its holding circuit at a1 and the circuit of one of the windings of the change-over relay O at a3. It also closes contacts a2 so as to prepare a circuit of the first even relay B. Although a circuit, including the resistance r, a winding of the relay O, the wire v and the contacts a3, is complete, the winding is not excited because it is shunted by a connection s until the switch p opens. When this occurs the relay O changes over the connection at switch o1 to the lower contact and the even line x. This causes the relay B to be operated at the next closing of the switch p, whereupon it closes its holding circuit at contacts b1, opens the holding circuit of the relay A at contacts b4 and prepares the circuit of relay C at contacts b2. Although the circuit of the first winding of relay O has now been opened at contacts a3 this relay is held operated by the other winding through the wire u, the switch o1 and the switch p. At the break of the circuit at switch p this relay O is released and switch o1 is changed over to the upper position and the odd line w.

This method of operation proceeds through the set of relays from A to N. The operation of the relay N prepares the circuit of the relay A by the closing of the contact n2 so that the cycle may restart at the relay A, following the operation of relay N, and may thus continue so long as the operation of the control signal switch p continues. If, however, this cyclic operation is not required the lead from the odd line w to the relay A through the contacts n2 may be omitted, with the result that the operation will terminate with the relay N (or earlier if the control signal stops) and can be restarted by the push button switch W, after clearing (if required) any operated relay by a manual switch t connecting the hold line y to earth. The switch W may be replaced by a series chain of normally closed contacts opened by any one of the relays A to N. This will permit the operation of the relays to start when the control signal switch p is closed without any other operation being necessary. It will be seen that for the cyclic operation in the way described an even number of sequence relays is necessary. It will be learned, however, from the description of other figures, to follow, that repetition can be obtained in other ways.

In the modification, shown in Figure 1A, of the above described circuit, permanent connections replace the normally closed contacts a4, b4 . . . n4 previously included in the holding circuits for relays N, A . . . M. Also there are introduced normally closed contacts b3, d3 . . . n3 in series with the normally open contacts a3, c3 . . . m3 associated with the relay O. In the preceding case each relay remained in the operated condition only for a short time, being released by the following relay. With the changed connections now used each relay remains operated until the end of the sequence. All the relays are then cleared by the last relay N opening contacts n5 which replace the manual switch t, thereby breaking the holding circuits previously maintained through the contacts a1, b1 . . . n1. The contacts b3, d3 . . . n3 of the even relays now serve the purpose of opening the circuit of the first winding of the change-over relay O at each actuation of an even relay, in spite of the previously connected contacts a3, c3 . . . m3 remaining closed throughout the sequence after each has been actuated. The starting of the sequence may also in this case be effected either by the push button switch W or by a chain of contacts taking the place of this switch which are normally closed and are opened by any of the relays A to N.

A rectifier re is shown in the connection s in Figures 1 and 1A and the other figures. It is disposed so that it does not interfere with the functioning of the connection s as described but prevents an earth connection for any of the odd relays A, C, etc., being established by way of the line s and a winding of the relay O. It functions, therefore, as a safeguard of the actions described in connection with the several figures. Rectifiers are also shown in other positions in some of the figures for functioning similarly.

In Figure 2 the type of circuit arrangement just described is adapted to the counting, up to ten operations, of the signals given by the switch p, the number reached at any time being shown by one of the lamps indicated in the lower part of the figure by the circles numbered 1 to 9 and 0. The part shown in the figure forms the units section of a counter having one or more other sections of higher denomination. The carrying from the units section to the tens section is effected by the closing of the switch e15 which places the change-over relay of the tens section under the control of the switch p for the units section for one make and break thereof at each closing of the switch e15.

The counting process proceeds cyclically in the units section, continuing as long as is required to cover the number to be counted, carrying to the tens section taking place at each completion of a cycle. The counting of each ten is performed by the use of only five sequence relays A, B, C, D, E. The switches which serve for lighting the lamps also perform a function similar, but not identical, so that of contacts a3 . . . n3 of Figures 1 and 1A in the control of the change-over relay O.

The counting starts with the number 1 displayed at lamp 1 in readiness for the first closing of the switch p. This closing operates the relay A which then causes the lamp numbered 2 to be lit. Counting through the numbers 2, 3, 4, 5 and 6 is effected by the operation of the relays A, B, C, D and E all of which remain operated at this stage. Counting for 7, 8, 9, 10 and 11 is effected by the release of the five relays. The numbers recorded by the relays are shown by figures spaced above and below the coils, the upper ones being counted by the operation of the relays and those below being counted by the release of the relays. At the end of the operation one digit has been carried to the tens section and the contacts are again in the positions shown in the drawing, the lamp numbered 1 being lit. A lamp in the tens unit will also show the numeral 1.

Each of the relays A, B, C, D, E of this figure has two windings which are in separate circuits as shown in the figure.

The steps of the operations are as follows. The switch p is closed, causing the relay A to be operated by means of one of its windings and to hold by the other winding through contact a1 and to prepare the relay B by closing contact a2 and opening contact a5. It also, by contact a6, transfers the connection from lamp 1 (which receives its current by way of the line v2) to lamp 2. This does not light at this stage, since the winding of the relay O, with which it is in series, is shunted by the connection s, as in Figure 1, but, on the opening of the switch p relay O operates, the change-over switch o1 moves to the lower position and lamp 2 lights. This establishes a circuit for relay B which is operated when switch p next closes. This relay then holds in at the contact b1 and prepares the circuit for relay C by closing b2 and opening b5. At the same time at b6 it breaks the circuit of the first winding of relay O through the line v and lamp 2 and makes a circuit for lamp 3 from the line v2 to earth.

This closing of switch p has energised the second winding of the relay O which holds the change-over switch o1 in the lower position until the circuit is broken at p, whereupon the relay O releases and switch o1 takes the upper position. The next two operations (each including make and break) of the switch p brings the relays C and D into action, lighting lamps 4 and 5 in turn. When relays A, B, C and D have operated, they have, in addition to the contacts mentioned, also moved contacts a7, b7, c7 and d7, but this has been without other immediate result. When the next closing of the switch p brings the relay E into operation, the contact e6 with the aid of the contact a7 causes lamp 6 to light.

Relay E, in addition to closing its holding contact e1, also closes contact e15 and contact e5 and opens contact e2. Contact e15 is inoperative at this stage since contact $c5$ is open so that no connection with switch $p$ can be made.

It will be noted that since there are an odd number of relays in the sequence in this arrangement the odd relay A, which now follows the relay E in the sequence, has to be put under the control of the change-over switch $o1$ in its lower position, that is by way of the even line $x$. This is done by means of the shunt connection established by contact $e5$ which has the effect that with switch $o1$ in the lower position the closing of switch $p$ diverts current from the relay A so that, in spite of the existence of the connection by way of contacts $a1$ and holding line $y$, the relay is released. This causes contact $a5$ to close, thereby establishing a similar shunt for the relay B when the change-over switch $o1$ is in the upper position and switch $p$ closes.

This process of control of odd relays A, C, E, through the even line $x$ and even relays B, D through the odd line $y$ continues through the series. On the closing of the contact $c5$ and the establishment of the shunt to the relay D by way of switch $o1$ and switch $p$, the closed switch $e15$ puts the change-over switch of the tens section of the counter in connection with switch $p$ so that its next actuation, that is closing and opening, is effective in the tens section. It is also effective in releasing relay D which is followed by the release of relay E by means of closed contact $d5$.

During the release of relays A to D, the lamps 7, 8, 9 and 0 have been lit in sequence due to the moving of the switches $a7$, $b7$, $c7$ and $d7$ to the right. When relay E is released switch $e6$ changes over to the left and the position is as shown in Figure 2, lamp 1 being lit with the corresponding lamp in the tens section. At this stage the circuit arrangements are ready for continuation of the counting of the next ten operations of switch $p$.

When a count is complete the total can be read from the lamps which are lit in the banks corresponding to the several denominations. All the sections can then be cleared by opening the holding wires, for instance by means of a switch $t$ on each section.

In addition to lighting the lamps, the counter may also record the number by other means, for instance by printing, and this may be done for each number counted, the gear for carrying out the recording being interlocked with the switch $p$ so that each record has to be made before a further item can be counted.

The arrangement shown in Figure 3 provides for the connection of each of the four wires of a quad of a telephone cable in turn to an insulation testing apparatus RT. The arrangement can deal with a number of quads in succession. The figure shows two quads Q1 and Q2; quad Q1 being dealt with by relays A, B, C and D and quad Q2 by relays E, F, G and H. The connections for the latter set of relays are identical with those of A, B, C and D, and are not separately described. The arrangement may be extended to include more than two quads according to the requirements of the case. In the testing of the quads by the insulation tester RT, the testing of each quad may follow the testing of previous quad in direct succession, or may be spaced apart in time by an interval to allow for other operations, such as the testing of a quad in respect of other properties.

The switch $rt$ is closed to initiate the testing of the quad by outside means (not shown). The circuit is then opened and closed again at intervals of one second at the contacts $p$ by the insulation tester RT until the testing of the quad has been completed. If, however, one of the wires in the quad should fail to pass the test the operation of the tester is stopped automatically and the process has to be started again by hand. In the first group of four relays, A and C are odd relays and B and D are even relays as in previous examples. The change-over relay O operates under the control of the switch $p$ and the odd relays. In addition to the odd line $w$ and the even line $x$ there is an auxiliary odd line made up of the parts $w3$ and $w4$ and an auxiliary even line made up of the parts $x3$ and $x4$. These auxiliary lines are put into connection with the lines $w$ and $x$ by the switches $sa1$ and $sa2$ respectively. These switches $sa1$ and $sa2$ are closed by external control when the testing of a quad is to start. The corresponding switches $sa11$ and $sa12$ for the group of relays E to H are under separate but connected control, so arranged that the two sets of switches are never closed at the same time.

Assuming that switches $sa1$ and $sa2$ have been closed for the testing of quad Q1 and switch $rt$ is closed so that switch $p$ is brought into operation, relay A is operated through contacts $d8$ auxiliary line $w3$, contacts $b8$, auxiliary line $w4$, contacts $sa1$ and $o1$. This relay holds by its contact $a1$ through contacts $b4$ to the hold line $y$ and puts one of the wires of quad Q1 in connection with the tester RT by contact $a9$. At the opening of switch $p$ and consequent removal of the short circuit through the line $s$, the change-over switch $o1$ is moved by relay O, excited through line $v$ and contact $a3$. At the next closing of switch $p$, relay B is operated through contact $c8$ auxiliary line $x4$, contact $sa2$ and the change-over switch $o1$ in the lower position. Relay B holds by contact $b1$ and releases relay A at contact $b4$. This first conductor of quad Q1 is thus disconnected from the insulation tester RT by the opening of contacts $a9$ while the closing of contacts $b9$ has connected up the second conductor. Relay B also prepares relay C for operation by way of the contact $b8$, which is changed over to the lower position. By the release of relay A, contact $a3$ in the operating line to relay O is opened and at the next opening of switch $p$ relay O releases and contact $o1$ changes to the upper position. This provides that at the next closing of the switch $p$ the relay C is actuated. This relay C holds at contact $c1$ and transfers the holding circuit of relay B through contacts $b1$ to the hold line $y$ to the operating line $w$ of relay C through the make-before-break contact $c4$. It also closes contact $c3$ so that on the opening of $p$ relay O changes over its contact $o1$ to the lower position. By the opening of contact $p$ the holding circuit of relay B through the line $w$ is broken and this relay B released. The operation of relay C also changes over the connections from the quad to the tester RT by opening and closing $c9$ and prepares the operating circuit from line $x$ for relay D at the contact $c8$ which moves to the lower position. Relay D operates at the next closing of switch $p$ and then holds at contact $d1$ and transfers the hold circuit for relay C from the hold line $y$ to the operating line $x$ for relay D by the make-before-break contact $d4$ so that relay C is released at the opening of switch $p$. The operation of relay D also changes over the connection to the tester RT by opening contacts $c9$ and closing contacts $d9$. It also prepares a circuit for a relay T by moving the two position contacts $d8$ to the upper position, to complete a circuit through contact $b8$, switch $sa1$ and odd line $w$, so that on the release of switch $p$ and the movement of the contact $o1$ to the upper position the circuit of the relay T is prepared for operation at the next closing of the contact $p$ which occurs at the end of the test on quad Q1. One function of the relay T is to clear this group of relays A, B, C, D by the opening of the holding line at the contact $t$.

Figure 4 represents the units section of a circuit arrangement for use in adding impedance in unit steps to the circuit of a bridge to produce balance. This section is intended to be associated with one or more sections of higher denomination (tens, hundreds, etc.) to provide for the maximum addition that may be required. The operation of the apparatus is initiated by the closing of the switch $k$. This switch may be closed by hand or by some automatic gear. It is opened to stop the addition of impedance when a balance has been obtained, which is determined by apparatus not shown.

The relays A, B, C and D each operate to add one unit. The relay E adds 5 units. Since in order to pass through every possible value in unit steps it will be seen that when passing from the value 4, obtained by relays A, B, C and D, the value 5, obtained by relay E, the first four units must be removed from the circuit before the addition of five units is made by relay E. This is taken care of by the operation of the relay M. The further additions proceed in steps of one unit in the order of relays B, C, D and A till a value of 9 has been reached. At the next step all relays A, B, C, D, E, and M are released and then the relay R makes connection with a tens section by which an impedance of 10 units is inserted. The unit section then comes into operation again and the process is repeated cyclically with the addition of 10 units at the end of each cycle.

The control switch is indicated by $pe$. It is actuated by the relay PE which itself is controlled by contact $pc$, actuated by relay PC. This arrangement provides an additional measure of security since it will be seen that relay PC can only be actuated to open contact $pc$ after each step of the sequence relays has been effected.

For co-operation with the relay PC an additional change-over switch $o2$ is provided on the relay O. It will be understood that the two changeover switches $o1$ and $o2$ move together. The switch $o2$ provides an earthing circuit for the relay PC by way of the holding line $y$ with which an auxiliary odd line $w2$ and an auxiliary even line $x2$ are caused to be connected by holding contacts of the odd and even relays respectively.

It will be seen that, for cooperation with the sequence relays, auxiliary odd lines $w1$ and $w3$ and an auxiliary even line $x1$ are provided in addition to odd line $w$ and even line $x$.

The operation of the arrangement is as follows.

On the movement of the starting switch $k$ to the position shown, the circuit of relay PE is completed and switch $pe$ closes. This causes relay A to operate by way of contacts $b13$ and $m10$ and change-over switch $o1$. Relay A holds by contact $a1$ and holding line $y$, switch $m1$, auxiliary holding line $y3$, switch $r1$ and earthing line $y4$. As previously indicated, the effect of this operation is to add one unit of impedance. The completion of the holding circuit at $a1$ puts the auxiliary odd line $w2$ to earth by way of contact $b12$ and causes the relay PC to operate over contacts $o2$. This causes switch $pe$ to open, whereupon relay O operates, and the changeover switches $o1$ and $o2$ move to the lower positions. This breaks the circuit of relay PC and causes switch $pc$ to close, whereupon relay PE operates, switch $pe$ is closed and relay B operates by way of contacts $c11$ and $o1$.

Relay B closes its holding contact $b1$ and this puts the auxiliary even line $x2$ into connection with the holding line $y$ by way of contacts $e15$ and $c15$. Relay PC, accordingly, is made to operate, opening switch $pc$ to release relay PE and thereby opening switch $pe$, whereupon relay O releases and the change-over switches $o1$ and $o2$ move to their upper positions.

Relay B has also, by contact $b13$, prepared a circuit for the relay C so that when $pe$ next closes relay C operates holding by contact $c1$ and putting the auxiliary odd line $w2$ in connection with the holding line $y$ by way of switch $d12$. This causes relay PC to operate again and switch $pe$ opens, whereupon relay O operates and moves the change-over switches $o1$ and $o2$ to the lower positions.

Relay C, by way of switch $c11$ has prepared a circuit for relay D so that at the next closing of $pe$ this relay operates holding by contact $d1$ and completing the circuit of relay PC by that contact. This produces the operation of relay PC and opening of switch $pe$, followed by the movement of the change-over switches $o1$ and $o2$ to their upper positions.

Relay D has prepared at switch $d11$ a circuit by way of contact $b13$ (up) for relay M and on the next closing of switch $pe$ this relay M operates and holds at contact $m1$ (down). This movement of $m1$ breaks the holding circuit of relays A, B, C and D by disconnecting line $y$ from line $y3$ and earth. Relay A is prevented by opened contact $m10$ from re-closing at this stage. The release of relays A, B, C and D causes contact $a16$, $b16$, $c16$ and $d16$, previously held open by these relays, to reclose, whereupon relay E operates holding in at contact $e1$ and thereby establishing the circuit of relay PC through contact $b11$, line $w2$ and contacts $o2$. This causes the opening of $pe$ and the change-over of the switches $o1$ and $o2$. Relay E also reconnects the holding line $y$ to earth by contact $e10$.

The next relay to operate must be an even relay since switch $o1$ is in the lower position. This is the relay B, the circuit for which is provided by the contacts $r2$ and $c11$ in the positions shown in the figure. When this relay B operates on the reclosing of switch $pe$ it holds by contact $b1$ and provides a circuit through that contact and contacts $a15$ and $c15$ for relay PC.

Relay B, as in the previous operation, prepares a circuit for relay C by contact $b13$ so that the operation of this relay proceeds as in the former operation. By contact $c11$ the circuit of relay D is prepared, as before, and this relay operates, holding by contact $d1$ and, as previously, making the circuit for relay PC.

The circuit of the remaining odd relay, that is relay A, is prepared, by way of contact $b13$ (up), contact $d11$ (up) and contact $e11$ (left side), and relay A is then actuated, holding by contact $a1$ and establishing the circuit for relay PC by way of contacts $a1$ and $e12$ and auxiliary odd line $w2$.

The total number of units at this stage has reached 9 and all the relays A, B, C, D, M and E are in the operated condition. The next operation of a relay is by way of the even lines and the relay operated as relay R. The circuit is provided by way of contact $e13$ in the left position, contact $a11$ closed, and contact $c11$ in the lower position.

On operating, relay R transfers its operating circuit by the make-before-break contact $r2$ to the line $x1$. It also opens contact $r1$ in the connection from line $y3$ to earth and thereby disconnects the holding circuits of all the other sequence relays, releasing them and taking out the nine units of impedance added by them. The contacts $e13$, $a14$, $b14$, $c14$ and $d14$ are now back in the positions shown in the drawing and the contact $r2$ is in the lower position. Accordingly, the switch $pe$ is connected by way of change-over switch $o1$ and the contacts just mentioned, through the auxiliary line $x1$ to the line $x5$ which will provide a connection to the centre contact of a change-over switch, corresponding to switch $o1$, in the tens section so that the switch $pe$ will be operative in that section for one signal, thereby causing the addition of 10 units of impedance to take the place of the 9 previously provided by the operation of relays A, B, C, D and E. At the same time the centre contact of the change-over switch $o2$, by the connecting line $x6$, which will lead to a corresponding contact in the tens section, will be connected to earth at the completion of the operation in that section, thereby producing the operation of relay PC resulting as above described in the release of relay PE and the opening of the switch $pe$. This will complete the signal from that switch to the tens section.

The cycle of operations will be repeated as long as it is necessary with the addition of ten units of impedance at the completion of each cycle of the units section. In due course the operations in the tens section may complete a cycle in that section which will be, as already indicated, similar to the units section, whereupon connection will be made with the hundreds section and the addition of 100 units of impedance thereby will take the place of the 99 units previously added by the units and tens sections.

What I claim as my invention is:

1. A relay arrangement for registering the number of closures of a single-pole single-throw switch of which one terminal is connected to one pole of a voltage source, comprising a single-pole double-throw switch, a signal input line connecting the central terminal of the double-throw switch to the other terminal of the single-throw switch, an odd-relay line connected at one end to one side contact of the double-throw switch and the switch being normally closed on that contact, an even relay line connected at one end to the other side contact of the double-throw switch, a set of sequence relays for energisation one at a time and in sequence and divided into an even relay group and an odd relay group, a connection from each sequence relay to the other pole of the voltage source, a holding connection from each sequence relay to the first mentioned pole of the voltage source and, in the holding connection, a normally open holding contact of the relay, an energizing connection from each odd relay to the odd relay line and an energising connection from each even relay to the even relay line, in each such energising connection a normally open energising contact and each of said energising contacts for at least the third and subsequent sequence relays being a contact of the preceding sequence relay, a reversing relay for controlling the double-throw switch and provided with one energising circuit connected between said other pole of the voltage source and the even relay line and with another energising circuit connected between said other pole of the voltage source and, through normally open contacts of the odd sequence relays, the first mentioned pole of the voltage source, each of the last mentioned contacts being closable by its relay to complete the last mentioned energising circuit, a permanent connection from the said other pole of the voltage source to the odd-relay line and means for preventing flow of energising current through said permanent connection to the odd-relay line, whereby each sequence relay is energisable by a closure of the single-throw switch, and the reversing relay, and thereby the double-throw switch, is reversible by each successive opening of the single-throw switch.

2. A relay arrangement for registering the number of closures of a single-pole single-throw switch of which one terminal is connected to one pole of a voltage source, comprising a single-pole double-throw switch, a single input line connecting the central terminal of the double-throw switch to the other terminal of the single-throw switch, an odd-relay line connected at one end to one side contact of the double-throw switch and the switch being normally closed on that contact, an even relay line connected at one end to the other side contact of the double-throw switch, a set of sequence relays for energisation one at a time and in sequence and divided into an even relay group and an odd relay group, a connection from each sequence relay to the other pole of the voltage source, a holding connection from each sequence relay to the first mentioned pole of the voltage source and, in the holding connection, a normally open holding contact of the relay and, in series with the holding contact, a normally closed contact of the next sequence relay, an energising connection from each odd relay to the odd relay line and an energising connection from each even relay to the even relay line, in each such energising connection a normally open energising contact and each of said energising contacts for at least the third and subsequent sequence relays being a contact of the preceding sequence relay, a reversing relay for controlling the double-throw switch and provided with one energising circuit connected between said other pole of the voltage source and the even relay line and with another energising circuit connected between said other pole of the voltage source and, through normally open contacts of the odd sequence relays, the first mentioned pole of the voltage source, each of the last mentioned contacts being closable by its relay to complete the last mentioned energising circuit, a permanent connection from the said other pole of the voltage source to the odd-relay line and means for preventing flow of energising current through said permanent connection to the odd-relay line, whereby each sequence relay is energisable by a closure of the single-throw switch and is releasable by the energisation of the next sequence relay, and the reversing relay, and thereby the double-throw switch, is reversible by each successive opening of the single-throw switch.

3. A relay arrangement for registering the number of closures of a single-pole single-throw switch of which one terminal is connected to one pole of a voltage source, comprising a single-pole double-throw switch, a single input line connecting the central terminal of the double-throw switch to the other terminal of the single-throw switch, an odd-relay line connected at one end to one side contact of the double-throw switch and the switch being normally closed on that contact, an even relay line connected at one end to the other side contact of the double-throw switch, a set of sequence relays for energisation one at a time and in sequence and divided into an even relay group and an odd relay group, a connection from each sequence relay to the other pole of the voltage source, a hold line and, connecting the hold line to the first mentioned pole of the voltage source, a connection including a normally closed contact of the final sequence relay, a holding connection from each sequence relay to the hold line and, in the holding connection, a normally open holding contact of the relay, an energising connection from each odd relay to the odd relay line and an energising connection from each even relay to the even relay line, in each such energising connection a normally open energising contact and each of said energising contacts for the second and subsequent sequence relays being a contact of the preceding sequence relay, a reversing relay for controlling the double-throw switch and provided with a first energising circuit connected between said other pole of the voltage source and the even relay and a second energising circuit connected between said other pole of the voltage source and the first mentioned pole of the voltage source, and the connection between the second energising circuit and said first mentioned pole being provided by normally open contacts of the odd sequence relays each in series with a normally closed contact of the next following even sequence relay, a permanent connection from the said other pole of the voltage source to the odd relay line and means for preventing flow of energising current through said permanent connection to the odd-relay line, whereby each sequence relay is energisable by a closure of the single-throw switch and all the sequence relays are releasable by the energising of the final sequence relay, and the reversing relay, and thereby the double-throw switch, is reversible by each successive opening of the single-throw switch.

4. A relay arrangement for registering the number of closures of a single-pole single-throw switch of which one terminal is connected to one pole of a voltage source, comprising a single-pole double-throw switch, a signal input line connecting the central terminal of the double-throw switch to the other terminal of the single-throw switch, an odd-relay line connected at one end to one side contact of the double-throw switch and the switch being normally closed on that contact, an even relay line connected at one end to the other side contact of the double-throw switch, a set of an odd number of sequence relays for energisation one at a time and in sequence and divided into an even relay group and an odd relay group containing one more sequence relay than the even relay group, an energising winding and a hold winding in each sequence relay, a connection from the other pole of the voltage source to one end of each energising winding, a connection from the odd relay line to the other end of each energising winding of each odd sequence relay and a similar connection from the even relay line to the other end of each energising winding of each even sequence relay line, said last mentioned connections for the second to last sequence relays each including a normally open contact of the immediately preceding sequence relay and said similar last mentioned connection for the first sequence relay including a normally closed contact of the final sequence relay, a connection from the first mentioned pole of the voltage source to one end of the hold winding of each sequence relay and in that connection a normally open contact of the relay, a connection from the even relay line to the other end of the hold winding of each odd sequence relay and from the odd relay line to the other end of the hold winding of each even sequence relay, each of said last mentioned connections for the second to last sequence relays including a normally closed contact of the immediately preceding sequence relay, said similar last mentioned connection for the first odd sequence relay including a normally open contact of the final odd sequence relay and, from the junction of each of said last mentioned connections with its hold winding, a permanently closed connection to said other pole of the voltage source, a reversing relay for controlling the double-throw switch and provided with one energising circuit connected between said other pole of the voltage source and the even relay line and with another energising circuit connected between said other pole of the voltage source and, through normally open contacts of the odd sequence relays, the first mentioned pole of the voltage source, each of the last mentioned contacts being closable by its relay to complete the last mentioned energising circuit, a permanent connection from the said other pole of the voltage source to the odd-relay line and means for preventing flow of energising current through said permanent connection to the odd-relay line, whereby the reversing relay, and thereby the double-throw switch, is reversible by each successive opening of the single-throw switch, and the sequence relays are energisable, and caused to remain energised, one after another in sequence during a number, corresponding to the number of sequence relays, of closures of the single-throw switch and are thereafter caused to be de-energised in sequence by further closures of the single-throw switch.

References Cited in the file of this patent

UNITED STATES PATENTS

| | | |
|---|---|---|
| 2,067,151 | Dicke | Jan. 5, 1937 |
| 2,389,275 | Rayner | Nov. 20, 1945 |
| 2,590,879 | McAlpine | Apr. 1, 1952 |
| 2,600,729 | Boyer | June 17, 1952 |